(12) United States Patent
Chung

(10) Patent No.: US 8,627,550 B1
(45) Date of Patent: Jan. 14, 2014

(54) DETACHABLE HANDLE SET FOR BARBECUE GRILL

(76) Inventor: Kiosky Chung, Taichung (TW)

( * ) Notice: Subject to any disclaimer, the term of this patent is extended or adjusted under 35 U.S.C. 154(b) by 0 days.

(21) Appl. No.: 13/602,190

(22) Filed: Sep. 2, 2012

(51) Int. Cl.
*A47J 37/07* (2006.01)
*A47J 45/00* (2006.01)
*A47J 45/10* (2006.01)

(52) U.S. Cl.
USPC .................................. 16/422; 294/9; 294/10

(58) Field of Classification Search
USPC ............. 16/422, 425; 294/9, 10, 12; 220/759, 220/752, 756; 126/9 R, 9 B, 42, 168, 169; D7/332, 334; D8/303
See application file for complete search history.

(56) References Cited

U.S. PATENT DOCUMENTS

| | | | | |
|---|---|---|---|---|
| 606,904 A * | 7/1898 | Tubbs | | 294/31.1 |
| 1,943,585 A * | 1/1934 | Cummins et al. | | 220/759 |
| 2,025,664 A * | 12/1935 | Taylor | | 16/267 |
| 2,490,898 A * | 12/1949 | Carris | | 126/169 |
| 3,269,765 A * | 8/1966 | Pryce | | 294/31.1 |
| 3,272,547 A * | 9/1966 | Pryce | | 294/31.1 |
| 4,215,667 A * | 8/1980 | Hsu | | 126/9 R |
| 4,471,985 A * | 9/1984 | Mahoney | | 294/10 |
| 4,482,181 A * | 11/1984 | Shepherd | | 294/12 |
| D282,518 S * | 2/1986 | Mahoney | | D7/688 |
| 4,801,166 A * | 1/1989 | Jordan et al. | | 294/9 |
| 5,346,268 A * | 9/1994 | Baker et al. | | 294/9 |
| 6,000,739 A * | 12/1999 | Zemit et al. | | 294/9 |
| 6,039,372 A * | 3/2000 | Noe et al. | | 294/10 |
| 6,068,314 A * | 5/2000 | Dorazio et al. | | 294/9 |
| 6,959,951 B2 * | 11/2005 | Amodeo | | 294/10 |
| 6,966,100 B2 * | 11/2005 | Sonne | | 16/110.1 |
| 7,240,403 B1 * | 7/2007 | Richardson | | 16/425 |
| 7,399,016 B2 * | 7/2008 | Barker et al. | | 294/7 |
| 8,465,068 B1 * | 6/2013 | Vinson, Jr. | | 294/9 |
| 2005/0052038 A1* | 3/2005 | Coleman | | 294/10 |
| 2012/0192724 A1* | 8/2012 | Harrison et al. | | 99/443 R |

* cited by examiner

*Primary Examiner* — Victor Batson
*Assistant Examiner* — Jason W San

(57) ABSTRACT

A handle set is used for detachable connection to a grill. The handle set includes a handle and a holding element. The handle includes an arched connecting element, two levers extending from the arched connecting element, and two hooks each extending from a respective one of the levers. The hooks are engaged with a crossbar of the grill in a releasable manner while the levers are in contact with another crossbar of the grill in a releasable manner. The holding element includes a rectilinear connecting element secured to the levers and two hooks extending from the rectilinear connecting element. The hooks can be engaged with another crossbar of the grill in a releasable manner.

8 Claims, 7 Drawing Sheets

DETACHABLE HANDLE SET FOR BARBECUE GRILL

BACKGROUND OF INVENTION

1. Field of Invention

The present invention relates to a barbecue grill and, more particularly, to a detachable handle set for a barbecue grill.

2. Related Prior Art

A typical low-cost grill includes a frame and crossbars attached to the frame. The frame and the crossbars are made of metal wires. In use, food is placed on the grill that is placed on a stove. It is intended to keep a proper distance between the food and flames produced by the stove so that the food can be heated in a proper range of temperature.

To handle the typical low-cost grill, it can be connected to a handle in a secured or detachable manner. To control the cost, the handle is also made of metal. In cases where the handle is secure to the grill, the handle is dumped together with the grill when the grill gets too dirty to clean up after it is used for a few times at most. Moreover, the handle could get hot together with the grill in use, and it could be difficult to hold the handle without using paper or cloth to wrap the handle in advance.

In cases where the handle is connected to the grill in a detachable manner, the handle can be used again when the grill is too dirty for further use. It is however difficult to firmly connect the handle to the grill. Hence, the handle could be detached from the grill. In such a case, the food could get dropped from the grill. This is waste of food, and it is troublesome to clean up the mass. What is worse, a user might be burnt by the food or grill.

The present invention is therefore intended to obviate or at least alleviate the problems encountered in prior art.

SUMMARY OF INVENTION

It is the objective of the present invention to provide a grill with a reliable detachable handle.

To achieve the foregoing objectives, the handle set is used for detachable connection to a grill. The handle set includes a handle and a holding element.

The handle includes an arched connecting element, two levers extending from the arched connecting element, and two hooks each extending from a respective one of the levers. The hooks are engaged with a crossbar of the grill in a releasable manner while the levers are in contact with another crossbar of the grill. The holding element includes a rectilinear connecting element secured to the levers and two hooks extending from the rectilinear connecting element. The hooks can be engaged with another crossbar of the grill in a releasable manner.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
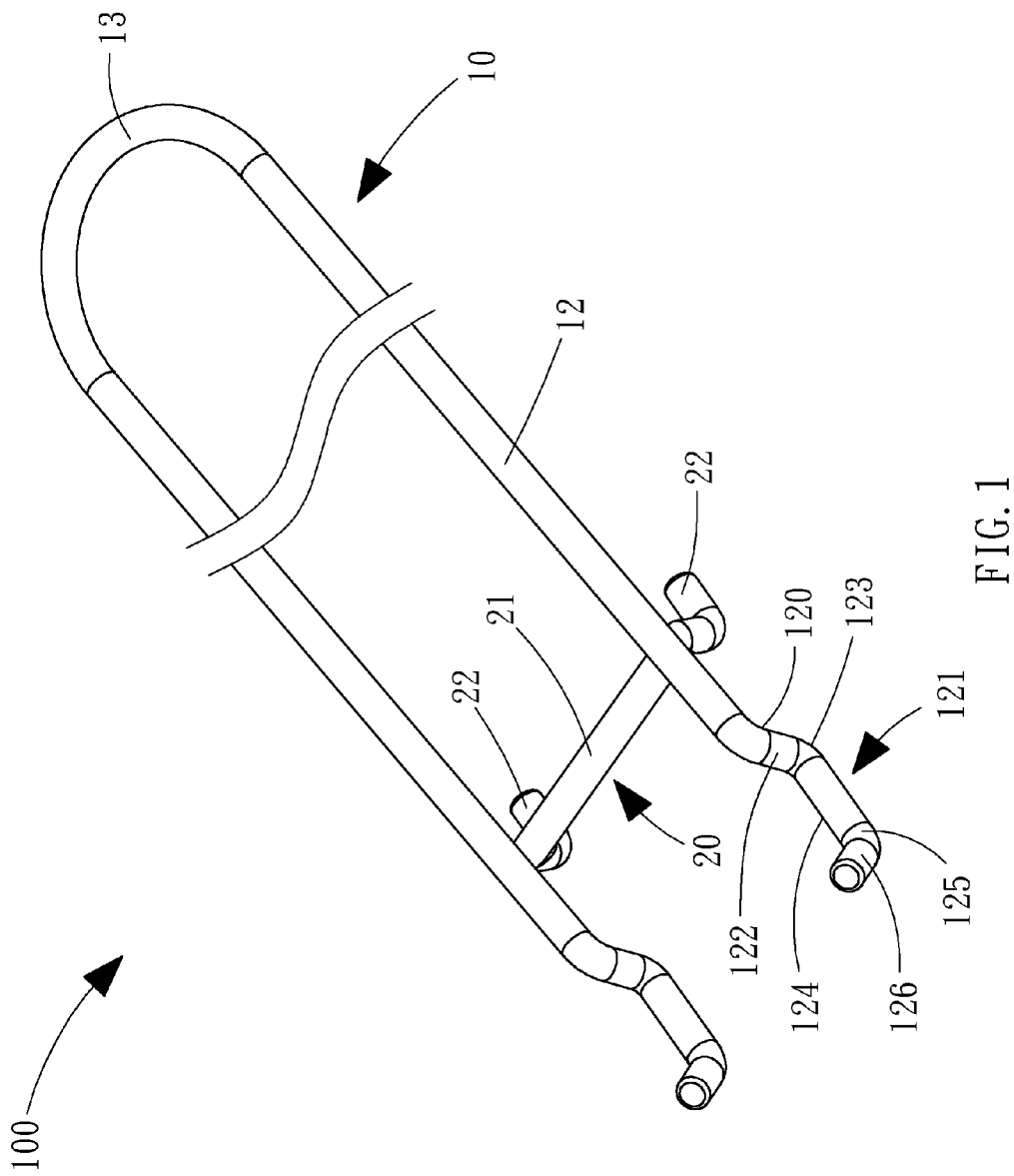
FIG. 1 is a perspective view of a detachable handle set according to the first embodiment of the present invention.
Figure 2:
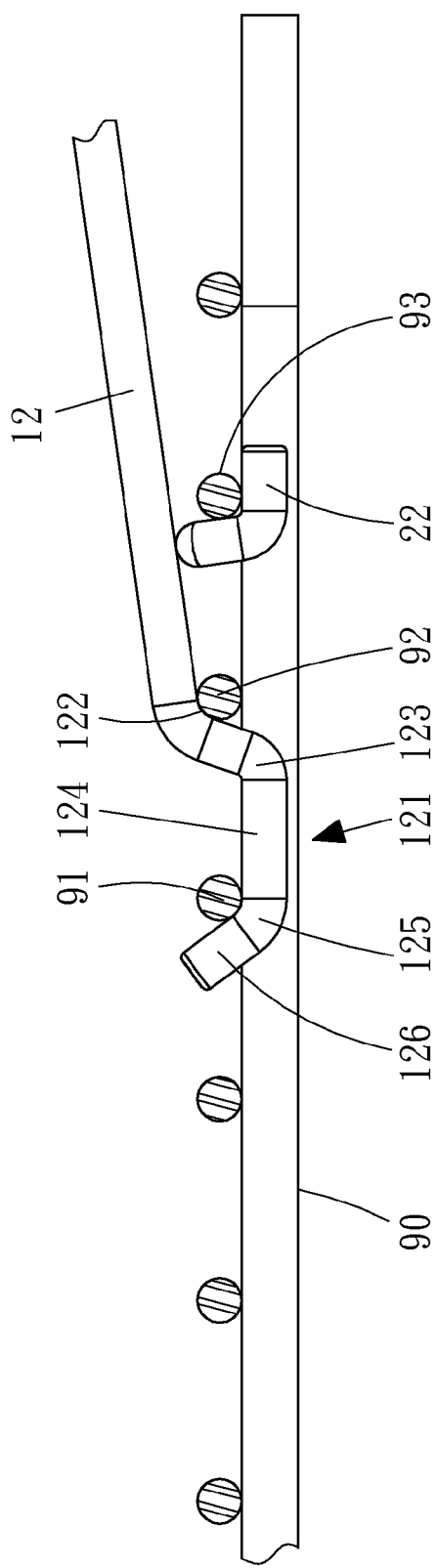
FIG. 2 is a cross-sectional view of the detachable handle set of FIG. 1.

Referring to FIGS. 1 and 2, there is shown a handle set 100 in accordance with a first embodiment of the present invention. The handle set 100 can be connected to a typical low-cost grill 90 to allow a user to move the grill 90 via the handle set 100. The grill 90 includes a frame and crossbars attached to the frame. The frame and the crossbars are made of metal wires.

The handle set 100 includes a handle 10 connected to a holding element 20. The handle 10 is made of a metal wire. The handle 10 includes an arched connecting element 13, two parallel levers 12 extending from the arched connecting element 13, and two hooks 121 each extending from a respective lever 12.

Each hook 121 includes a first bent section 120 extending from the respective lever 12, a first rectilinear section 122 extending from the first bent section 120, a second bent section 123 extending from the first rectilinear section 122, a second rectilinear section 124 extending from the second bent section 123, a third bent section 125 extending from the second rectilinear section 124, and a third rectilinear section 126 extending from the third bent section 125. The first rectilinear section 122 extends marginally longer than the diameter of the crossbars of the grill 90.

The holding element 20 is also made of a metal wire. The holding element 20 includes a rectilinear connecting element 21 extending between two buckles 22. The connecting element 21 is secured to the levers 12 by welding for example. Each buckle 22 includes a first bent section extending from the connecting element 21, a first rectilinear section extending from the first bent section, a second bent section extending from the first rectilinear section, and a second rectilinear section extending from the second bent section. The second rectilinear section of each buckle 22 extends opposite to the third rectilinear section 126 of a respective lever 12.

In operation, the handle set 100 is moved relative to the grill 90 in a direction. Thus, the third rectilinear section 126, the third bent section 125, the second rectilinear section 124, the second bent section 123 and the first rectilinear section 122 of each hook 121 are moved through a gap defined between two crossbars 91 and 92 of the grill 90.

Then, the handle set 100 is pivoted relative to the grill 90. Thus, the buckles 22 are moved through a gap defined between the crossbar 92 and another crossbar 93 of the grill 90.

Finally, the handle set 100 is moved relative to the grill 90 in an opposite direction. Thus, a lower face of the crossbar 91 is in contact with an upper face of the third bent section 125 of each hook 121. Moreover, an upper face of the crossbar 92 is in contact with a lower face of the first bent section 120 of each hook 121. Furthermore, a lateral face of the crossbar 93 is in contact with each buckle 22. The handle set 100 is thus firmly connected to the grill 90.

The handle set 100 can be detached from the grill 90 by reversing the above-mentioned process. Thus, the handle set 100 can be used again while the grill 90 can be disposed of.

Figure 3:
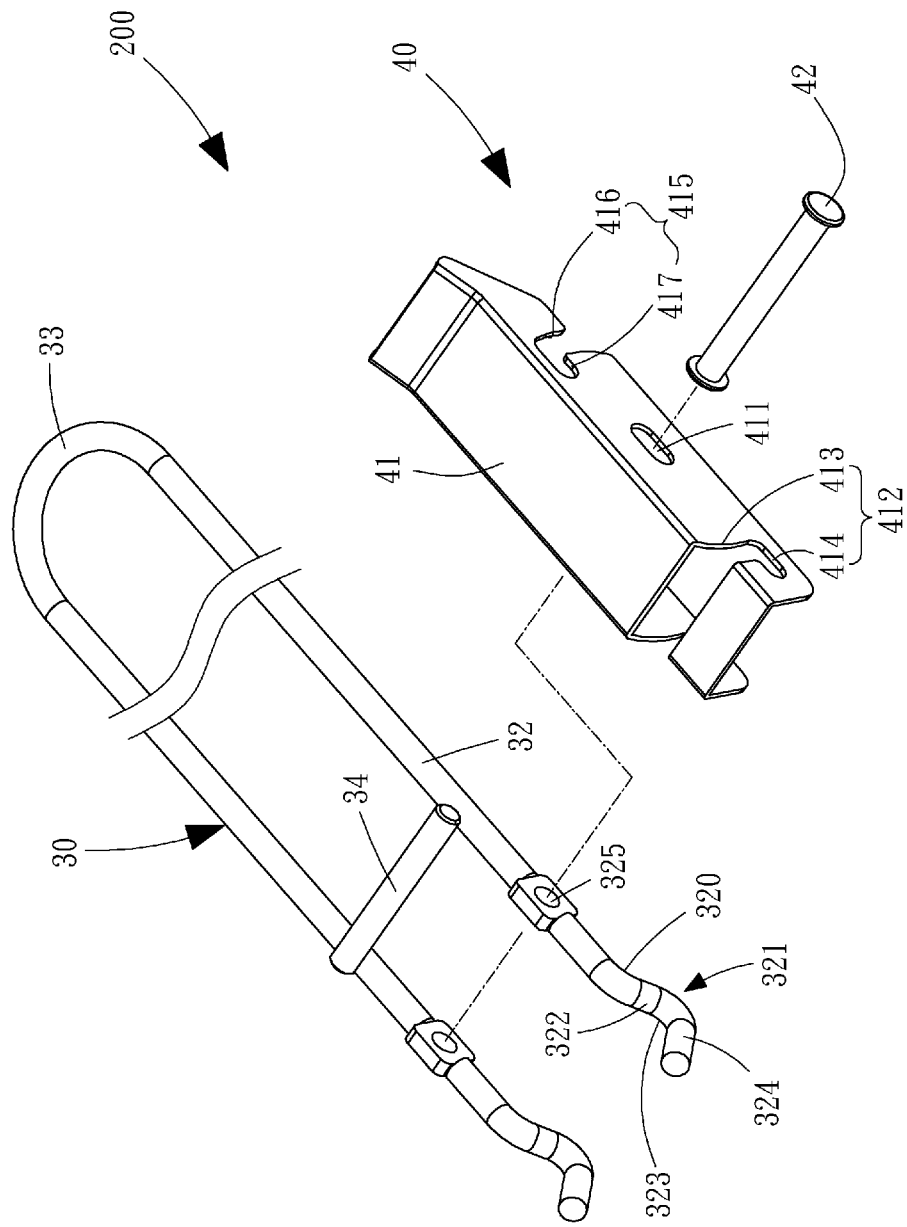
FIG. 3 is an exploded view of a detachable handle set according to the second embodiment of the present invention.
Figure 4:
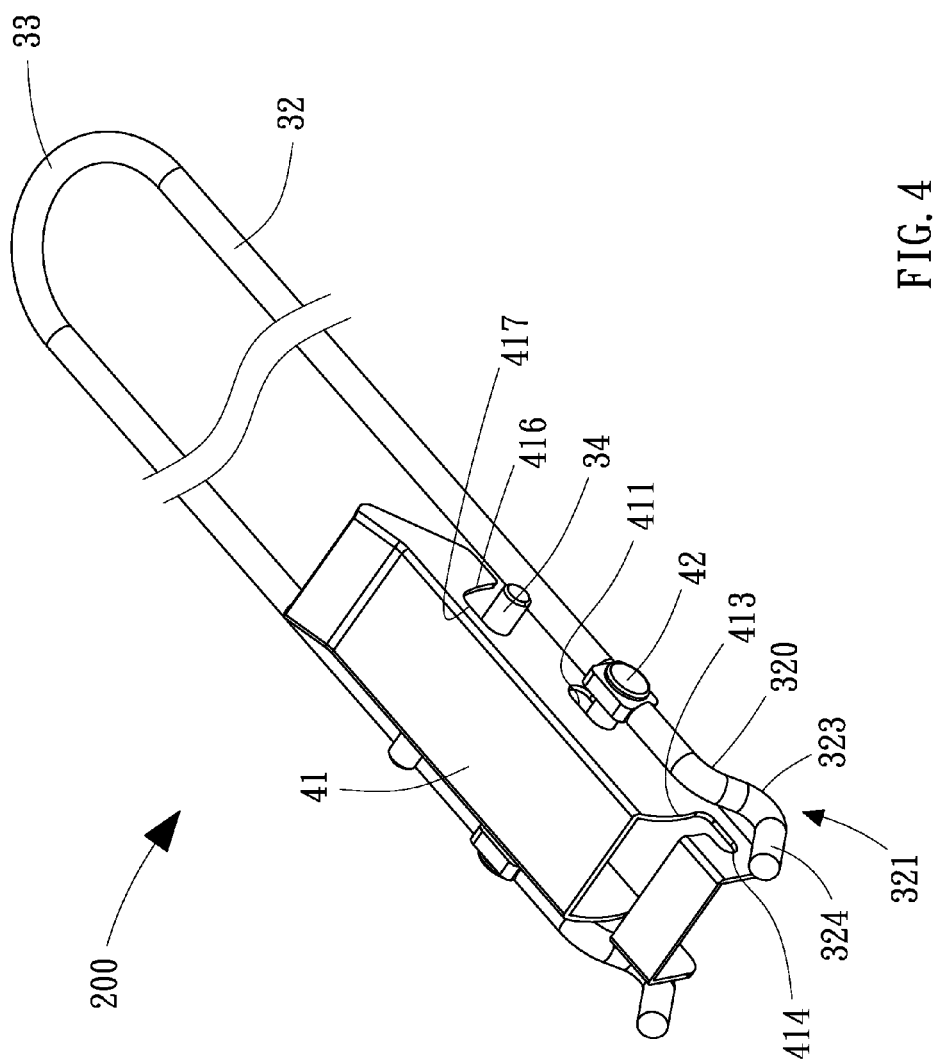
FIG. 4 is a perspective view of the detachable handle set shown in FIG. 3.

Referring to FIGS. 3 and 4, there is shown a handle set 200 in accordance with a second embodiment of the present invention. The handle set 200 includes a handle 30 and a locking unit 40.

The handle 30 is made of a metal wire. The handle 30 includes an arched connecting element 33, two parallel levers 32 extending from the arched connecting element 33, two hooks 321 each extending from a respective lever 32, and a rectilinear connecting element 34 secured to the levers 32 by welding for example.

Each lever 32 includes an aperture 325 defined therein. To this end, each lever 32 is preferably made with a flattened portion and the aperture 325 is made in the flattened portion.

Each hook 321 includes a first bent section 320 extending from a respective lever 32, a first rectilinear section 322 extending from the first bent section 320, a second bent section 323 extending from the first rectilinear section 322, and a second rectilinear section 324 extending from the second bent section 323.

The locking unit 40 includes a lock 41 and a rivet 42. The lock 41 is made of a metal sheet. The lock 41 includes a middle portion extending between two lateral portions. Each lateral portion of the lock 41 includes a slot 411 and two cutouts 412 and 415 defined therein. The slot 411 extends substantially horizontally. The first cutout 412 includes a vertical section 413 extending from the middle portion of the lock 41 and a horizontal section 414 extending from the vertical section 413. The second cutout 415 includes a vertical section 416 extending from an edge of the lateral portion of the lock 41 and a horizontal section 417 extending from the vertical section 416.

In assembly, the rivet 42 is movably inserted in the slots 411 through the apertures 325. Thus, the lock 41 is pivotally and movably connected to the handle 30. The lock 41 is pivoted relative to the handle 30 so that the rectilinear connecting element 34 is moved in the horizontal sections 417 of the second cutouts 415 through the vertical sections 416.

Figure 5:
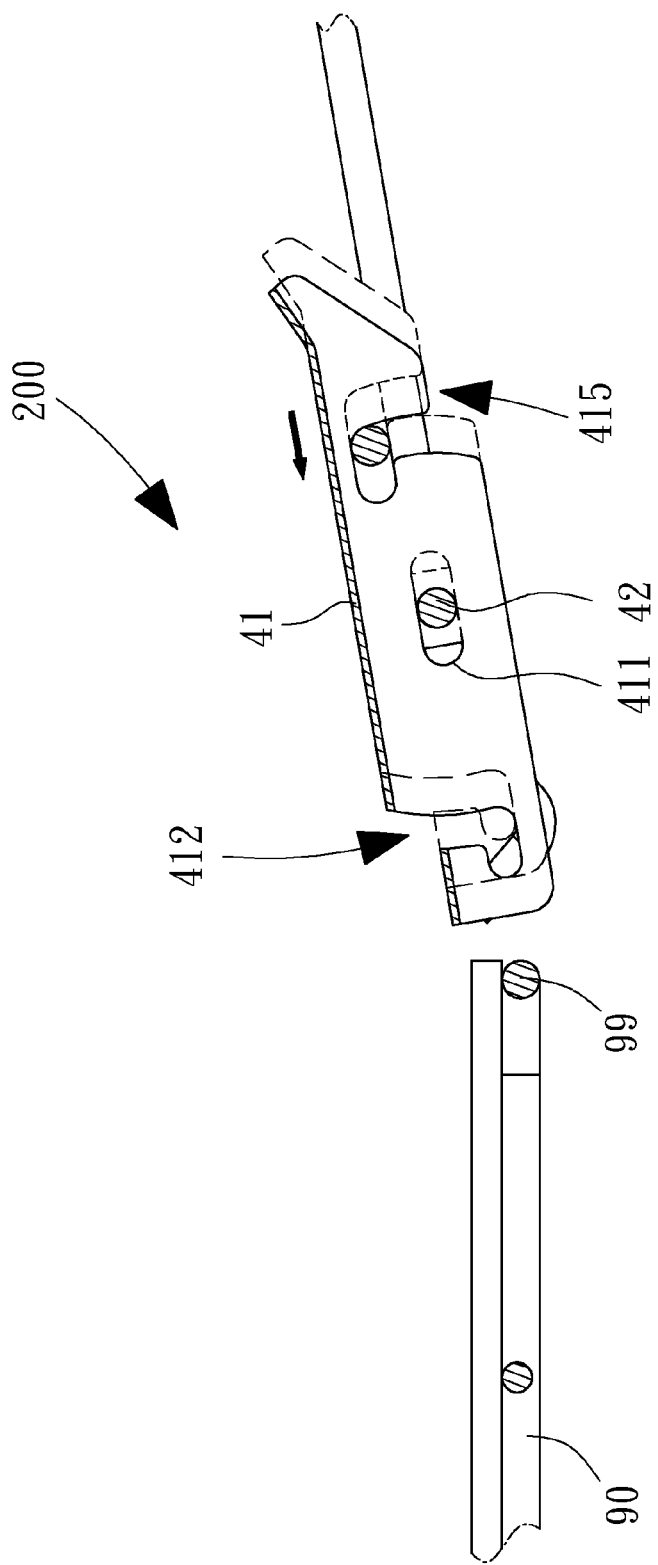
FIG. 5 is a cross-sectional view of a grill and the detachable handle set shown in FIG. 4.

Referring to FIG. 5, the handle set 200 is moved relative to the grill 90 in a direction. Thus, the second rectilinear section 324, the second bent section 323 and the first rectilinear section 322 of each lever 32 are moved past a crossbar 99 of the grill 90.

Figure 6:
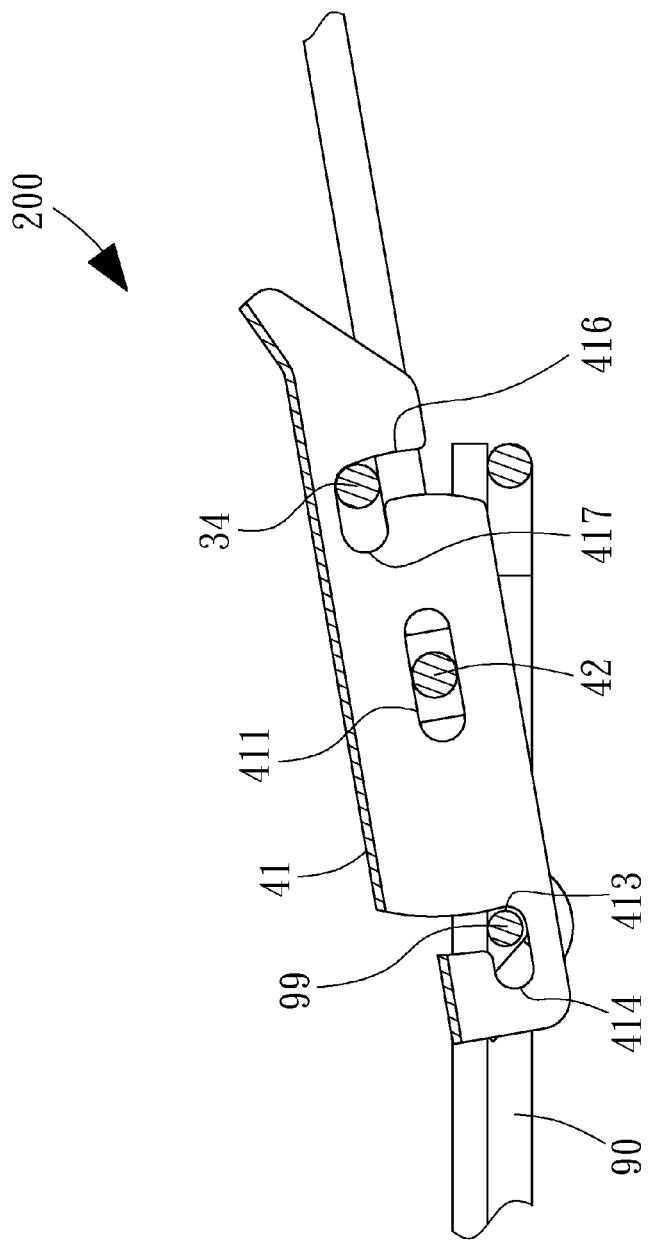
FIG. 6 is a cross-sectional view of the grill and the detachable handle set in another position than shown in FIG. 5.

Then, the handle set 200 is pivoted relative to the grill 90 with reference to FIG. 6. Thus, the crossbar 99 of the grill 90 is placed against the second bent sections 323 of the hooks 321. A portion of the grill 90 is placed against the lateral portions of the lock 41.

Figure 7:
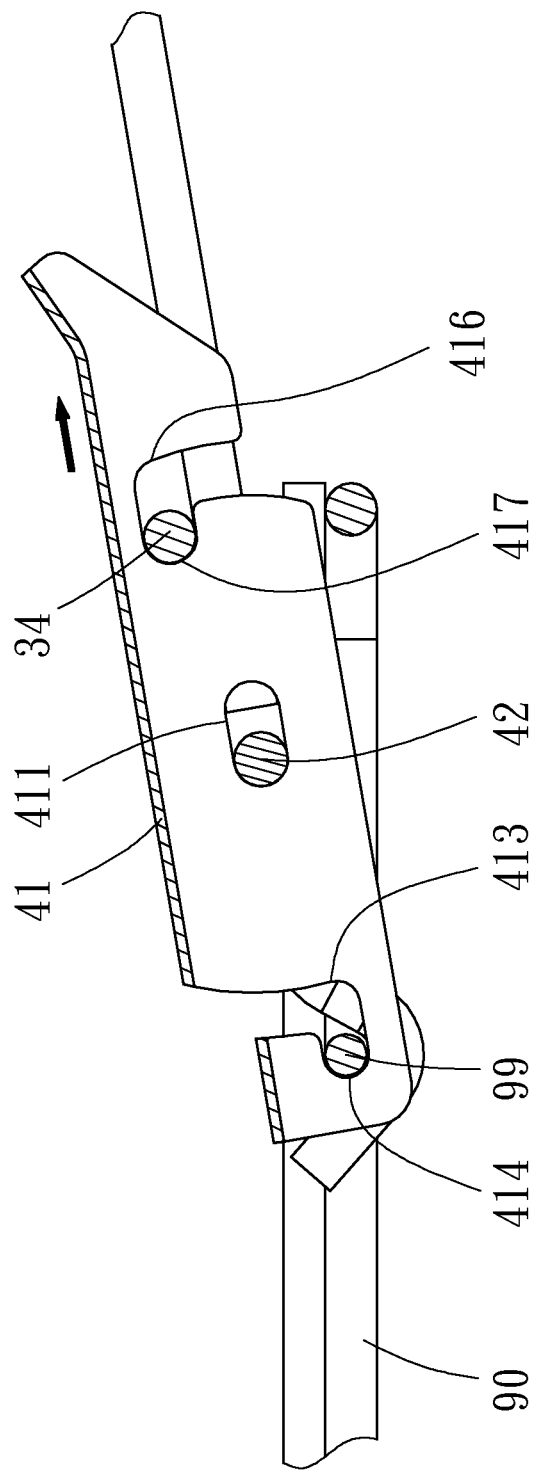
FIG. 7 is a cross-sectional view of the grill and the detachable handle set in another position than shown in FIG. 6.

Finally, the handle set 200 is moved relative to the grill 90 in an opposite direction as shown in FIG. 7. Thus, the crossbar 99 is placed against a closed end of the horizontal section 414 of the first cutout 412 of each lateral portion of the lock 41. Thus, the crossbar 99 is locked on the handle 31 by the lock 41. The handle set 200 is thus firmly connected to the grill 90.

The handle set 200 can be detached from the grill 90 by reversing the above-mentioned process. Thus, the handle set 200 can be used again while the grill 90 can be disposed of.

The present invention has been described via the detailed illustration of the embodiments. Those skilled in the art can derive variations from the embodiments without departing from the scope of the present invention. Hence, the embodiments shall not limit the scope of the present invention defined in the claims.

The invention claimed is:

1. A handle set for detachable connection to a grill provided with a crossbar, wherein the handle set includes:
   a handle including an arched connecting element, two parallel levers extending from the arched connecting element, two hooks each extending from a respective one of the levers, and a rectilinear connecting element secured to the levers, wherein the hooks are engaged with the crossbar of the grill in a releasable manner; and
   a locking unit movably connected to the handle between a releasing position where the hooks can hook and release the crossbar of the grill and a locking position where the handle locks the crossbar of the grill, wherein the locking unit includes:
      a lock made of a metal sheet and formed with:
         two lateral portions each including a slot, a first cutout for receiving the crossbar of the grill, and a second cutout for receiving the rectilinear connecting element; and
         a middle portion extending between the lateral portions; and
      a rivet inserted in the slot for movably connecting the lock to the handle.

2. The handle set according to claim 1, wherein the slot extends substantially horizontally.

3. The handle set according to claim 2, wherein the first cutout includes a vertical section extending from the middle portion of the lock and a horizontal section extending from the vertical section, wherein a closed end of the horizontal section of the first cutout is in contact with the crossbar of the grill as the locking unit is in the locking position.

4. The handle set according to claim 2, wherein the second cutout includes a vertical section extending from an edge of the lateral portion of the lock and a horizontal section extending from the vertical section, wherein a closed end of the horizontal section of the second cutout is in contact with the rectilinear connecting element in the locking position of the locking unit.

5. The handle set according to claim 1, wherein each of the levers includes an aperture defined therein, wherein the rivet is movably inserted in the slots through the apertures.

6. The handle set according to claim 5, wherein each of the levers includes a flattened portion in which the aperture is made.

7. The handle set according to claim 1, wherein the handle is made of a metal wire.

8. The handle set according to claim 7, wherein each of the hooks includes a first bent section extending from the respective lever, a first rectilinear section extending from the first bent section, a second bent section extending from the first rectilinear section, and a second rectilinear section extending from the second bent section, wherein the second bent section of each of the hooks is engaged with the crossbar of the grill.

\* \* \* \* \*